Patented Dec. 5, 1944

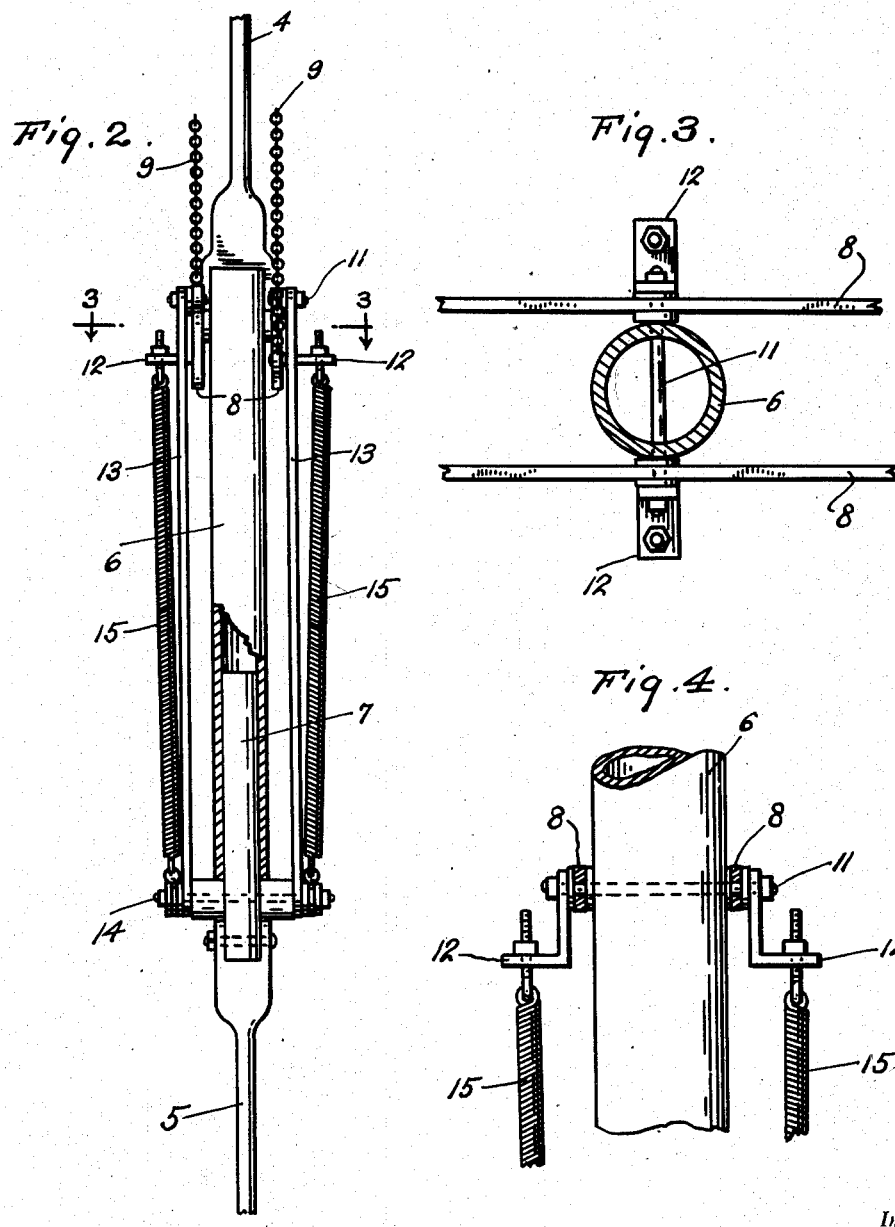

2,364,139

UNITED STATES PATENT OFFICE 2,364,139

WINDMILL POWER TRANSMISSION

Irvin Grumbles, San Saba, Tex.

Application October 5, 1943, Serial No. 505,081

1 Claim. (Cl. 74—110)

The present invention relates to new and useful improvements in power transmissions, particularly for windmills, although it will be understood that the device may be used in connection with any other type of pumping apparatus for which it may be found adapted and desirable.

An important object of the invention is to provide, in a manner as hereinafter set forth, a windmill power transmission of the character described comprising a novel construction and arrangement for lengthening or increasing and accelerating the stroke of the sucker rod.

Another important object of the invention is to provide a windmill power transmission of the aforementioned character which is adapted to adjust or regulate the stroke of the sucker rod.

Still another very important object of the invention is to provide means for equalizing the load on the windmill during the upward and downward movements of the sucker rod.

Other objects of the invention are to provide a windmill power transmission of the character set forth which will be comparatively simple in construction, strong, durable, highly efficient and reliable in use, compact, and which may be manufactured and installed at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 2 is an elevational view of the device taken at right angles to Figure 1, showing the lower portion of the tubular guide broken away in section.

Figure 3 is a view in horizontal section through the device, taken substantially on the line 3—3 of Figure 2.

Figure 4 is a fragmentary view in cross-section, showing the mounting of the levers on the upper portion of the tubular guide.

Figure 1:
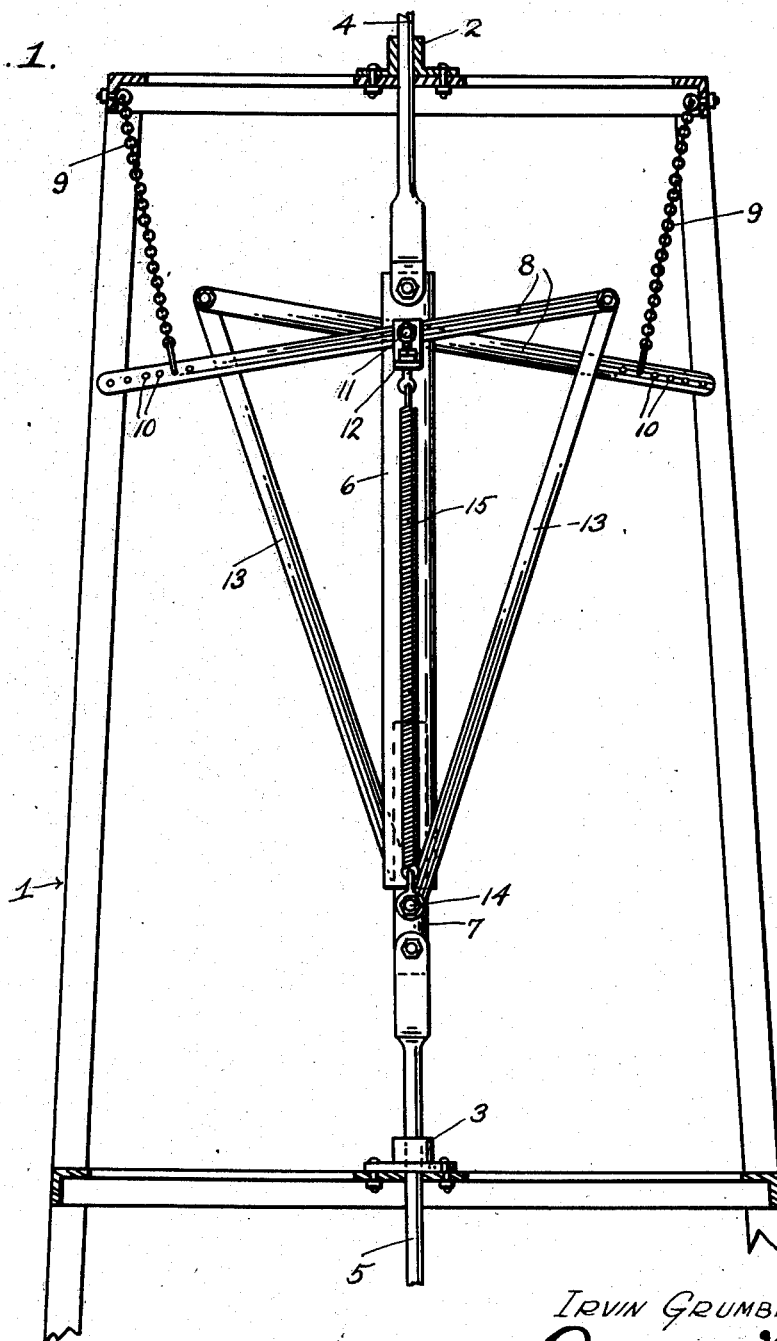
Figure 1 is a view in side elevation of a power transmission constructed in accordance with the present invention, showing the windmill tower in cross-section.

Referring now to the drawings in detail, it will be seen that reference character 1 designates generally a portion of a windmill tower. In the embodiment shown, the tower 1 has mounted thereon aligned, vertically spaced bearings 2 and 3. A power rod 4 from the usual head of the windmill is slidable in the bearing 2. A sucker rod 5 is slidable in the lower bearing 3.

Suspended from the lower end of the rod 4 is a tubular guide 6. The sucker rod 5 is suspended from the lower end portion of a plunger 7 which is slidably engaged in the lower portion of the guide 6. Levers 8 are pivotally mounted, at intermediate points, for vertical swinging movement on the upper portion of the guide 6 on diametrically opposite sides thereof. The outer end portions of the levers 8 are suspended from the tower 1 through the medium of chains 9. Spaced openings 10 in the outer end portions of the levers 8 permit the chains 9 to be adjustably connected thereto for varying the stroke of said levers. The levers 8 are journaled on a bolt 11 which extends through the guide 6. Angular brackets 12 are mounted on the end portions of the bolt 11, the purpose of which will be presently set forth.

Links 13 operatively connect the levers 8 at their inner ends to the plunger 7. The lower end portions of the links 13 are connected to the plunger 7 by means including a bolt 14 passing through said plunger. Equalizing springs 15 have one end connected to the brackets 12 and their other ends connected to the end portions of the bolt 14.

It is thought that the operation of the device will be readily apparent from a consideration of the foregoing. Briefly, when the rod 4 moves downwardly, the levers 8, pivoting at 11 and swinging on the chains 9, move the plunger 7 downwardly in the guide 6, thereby lowering the sucker rod 5. In this manner the travel of the rod 5 is increased and accelerated relative to the rod 4. The ratio of movement between the rods 5 and 4, or, in other words, the stroke of the rod 5 may be increased or decreased as desired by adjusting the chains 9 in the openings 10. When the plunger 7 moves downwardly, the coil springs 15 are tensioned. Thus, on the up-stroke the coil springs 15 assist in elevating the sucker rod 5 for equalizing the load.

It is believed that the many advantages of a windmill power transmission constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A power transmission comprising a tower, vertically aligned driving and driven rods slidable in said tower, a tubular guide suspended from the driving rod, a plunger on the driven rod slidable in said guide, levers pivotally mounted, at an intermediate point, on the guide, chains connected to one end portion of the levers for suspending said levers from the tower for swinging movement, links operatively connecting the levers to the plunger, and springs having one end anchored to the guide and their other ends connected to the plunger for assisting in elevating the driven rod.

IRVIN GRUMBLES.